United States Patent [19]
Kawata et al.

[11] Patent Number: 5,340,480
[45] Date of Patent: Aug. 23, 1994

[54] POLYSULFONE-BASED HOLLOW FIBER MEMBRANE AND PROCESS FOR MANUFACTURING THE SAME

[75] Inventors: Ichiro Kawata; Takehiko Okamoto; Hiroyuki Akasu; Kensaku Komatsu, all of Kurashiki, Japan

[73] Assignee: Kuraray Co., Ltd., Kurashiki, Japan

[21] Appl. No.: 53,074

[22] Filed: Apr. 26, 1993

[30] Foreign Application Priority Data

Apr. 29, 1992 [JP] Japan ................................. 4-137929

[51] Int. Cl.$^5$ .............................................. B01D 71/68
[52] U.S. Cl. ............................ 210/500.23; 210/500.41
[58] Field of Search ....................... 210/500.23, 500.21, 210/500.41; 514/56, 54; 530/395; 536/8; 264/41, 49

[56] References Cited

U.S. PATENT DOCUMENTS 5,071,973 12/1991 Keller et al. .............................. 536/8

FOREIGN PATENT DOCUMENTS 345151 12/1989 European Pat. Off. ..... B01D 13/00
362588 4/1990 European Pat. Off. ..... B01D 69/08
4000825 5/1990 Fed. Rep. of Germany ......... B01D 39/16

OTHER PUBLICATIONS vol. 12, No. 338 (C–527) Sep. 12, 1988 & JP-A-63 097 202 (Toray Ind Inc.) Apr. 27, 1988.
vol. 16, No. 54 (C–909) Feb. 12, 1992 & JP-A-32 54 826 (Kuraray Co. Ltd.) Nov. 13, 1991.
vol. 13, No. 516 (C–656) Nov. 17, 1989 & JP-A-12 10 003 (Daicel Chem Ind Ltd.) Aug. 23, 1989.

*Primary Examiner*—Frank Spear
*Attorney, Agent, or Firm*—Kramer, Brufsky & Cifelli

[57] ABSTRACT

The polysulfone hollow fiber membrane of the invention has an inner dense skin layer composed of a polysulfone and a less amount of a polyvinylpyrrolidone, a content of the polyvinylpyrrolidone in the dense skin layer being higher than that in an outer surface layer. This membrane has excellent biocompatibility and antithrombogenetic ability and is, therefore, useful in body fluid treatment, such as hemodialysis, hemofiltration and hemoconcentration, without clogging with thrombi.

11 Claims, 3 Drawing Sheets

FIG_1
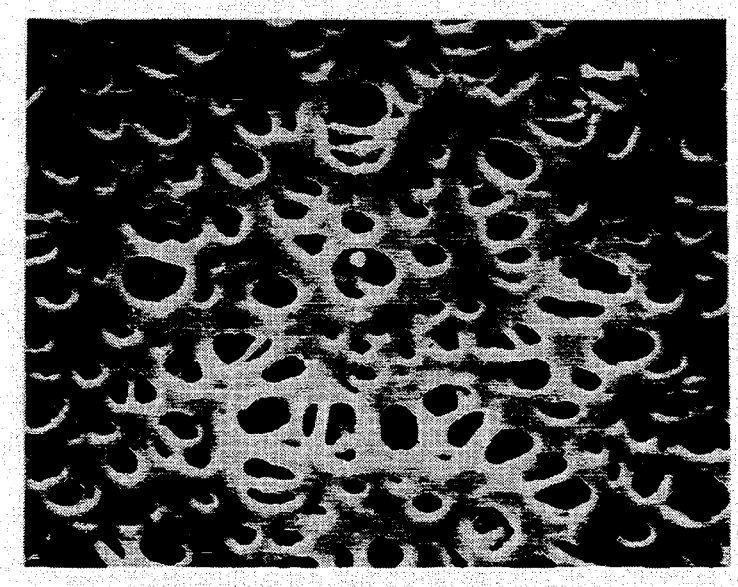
FIG_2
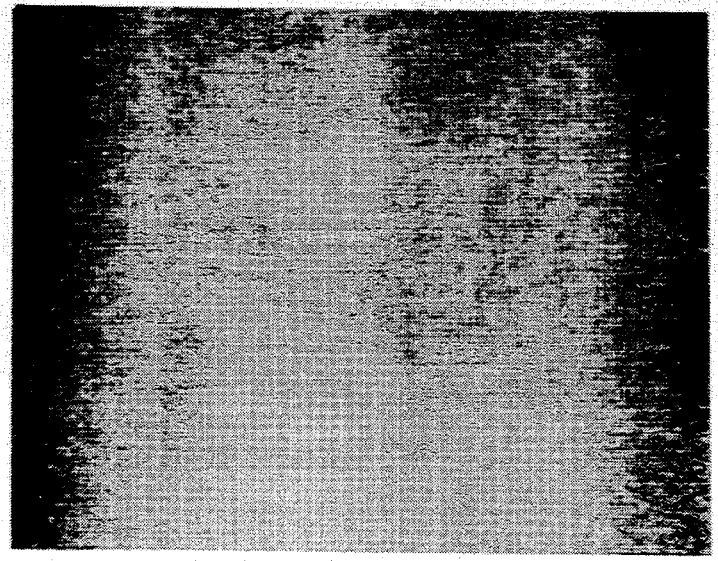

FIG_3
FIG_4
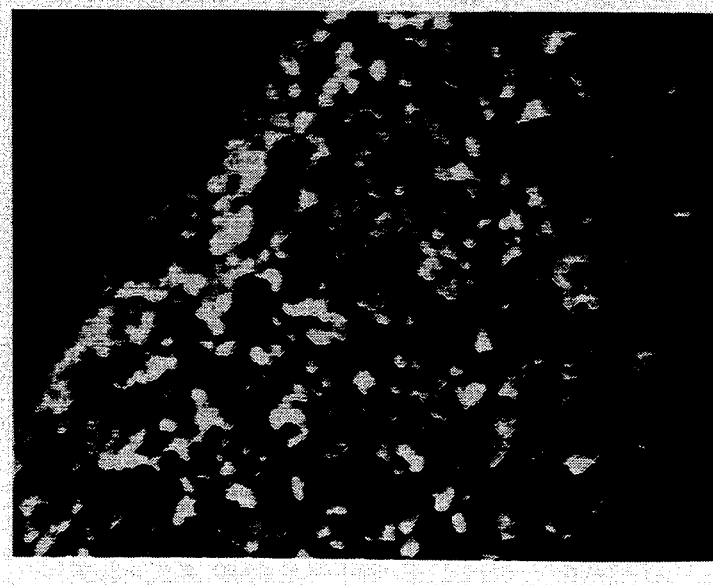

FIG_5
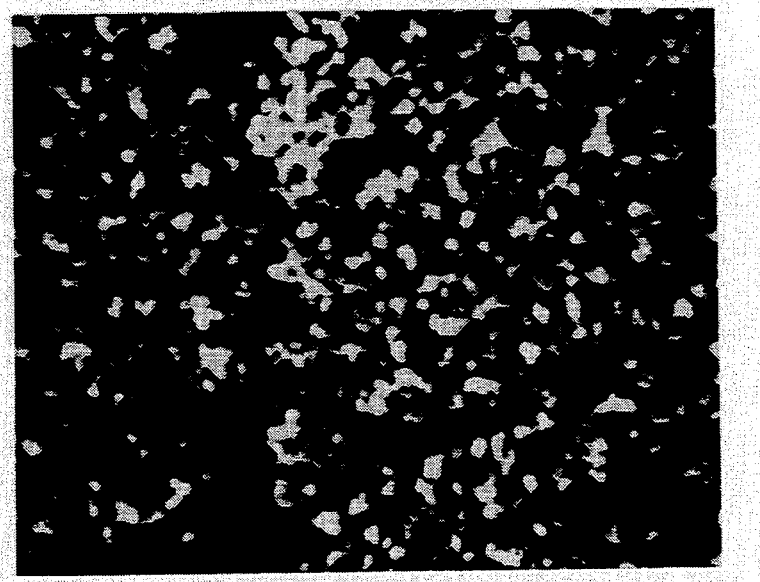
FIG_6
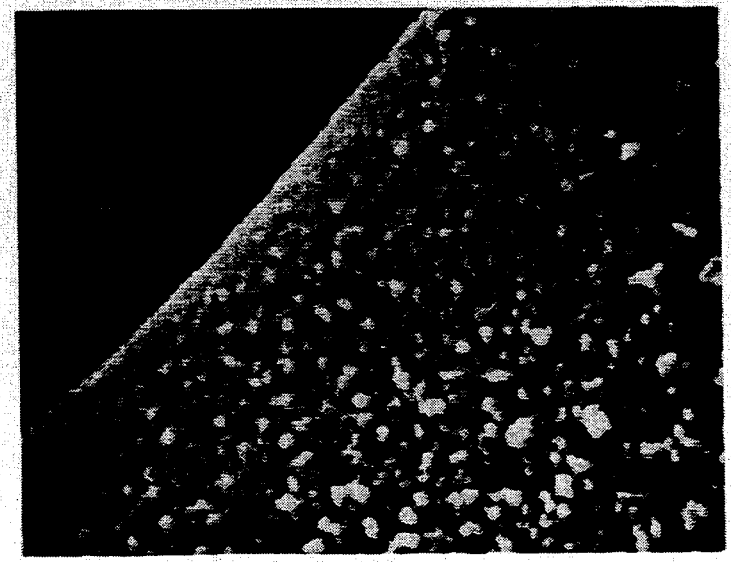

POLYSULFONE-BASED HOLLOW FIBER MEMBRANE AND PROCESS FOR MANUFACTURING THE SAME

BACKGROUND OF THE INVENTION

1. Field of the Invention

The present invention relates to polysulfone-based hollow fiber membranes and processes for manufacturing the same, more particularly, to polysulfone-based hollow fiber membranes comprising skin layers on their inner surfaces predominantly containing a vinylpyrrolidone-based polymer, which are adapted for blood treatment, and processes for manufacturing the same.

2. Description of the Prior Art

Recently separation techniques utilizing separatory membranes having selective permeabilities, such as ultrafiltration, reverse osmosis, gas separation or the like, have been brought into practical use and separatory membranes made of a material adapted for diversified applications have been placed in the market.

As materials for the selectively permeable membranes, use have been made of polymers such as cellulose-based, cellulose acetate-based, polyamide-based, polyacrylonitrile-based, polyvinyl alcohol-based, polymethyl methacrylate-based, polysulfone-based, polyolefin-based or the like. Since the polysulfone-based polymers, inter alia, have excellent physical and chemical properties, such as resistance to heat, resistance to acid, resistance to alkali, resistance to oxidation or the like, they have recently attracted attention as materials for separatory membranes in medical or industrial application.

However, since the polysulfone-based polymers are hydrophobic, selectively permeable separatory membranes made therewith have a poor water-wettability and a low performance in dry, as compared with selectively permeable separatory membranes made with a hydrophilic polymer.

Therefore, attempts have been made to improve the water-wettability of the selectively permeable separatory membranes made with a polysulfone-based polymer, by imparting hydrophilicity thereto. As one of these attempts, there have been proposed selectively permeable separatory membranes comprising a hydrophobic polymer such as polysulfone-based polymers or the like and a hydrophilic polymer such as polyvinyl pyrrolidones or the like and manufacturing processes thereof.

For example, Japanese Patent Application Publication No. 018,695/1990 discloses polysulfone-based separatory membranes containing a polyvinyl pyrrolidone having a molecular weight of at least 100,000 in an amount of 5–70% by weight based on the membrane and having a water-absorbability of at least 11%, which are manufactured by spinning a dope comprising a polysulfone, a polyvinyl pyrrolidone having a molecular weight of at least 100,000 and a solvent common to these polymers.

Japanese Patent Application Laid-open No. 61-093,801 discloses hollow fiber membranes adapted for blood treatment containing a hydrophilic polymer in an amount of 1–10% by weight and having a water-absorbability of 3–10%, which are manufactured by spinning a dope of a low viscosity comprising a hydrophobic polymer, a hydrophilic polymer and a solvent common to these polymers.

Japanese Patent Applications Laid-open Nos. 61-238,306 and 63-097,666 disclose processes for manufacturing polysulfone-based separatory membranes with a dope system comprising a polysulfone-based polymer, a hydrophilic polymer and an additive which is a non-solvent or swelling agent for polysulfone-based polymers.

Alternatively, Japanese Patent Applications Laid-open Nos. 63-097,205 and 63-097,634 disclose processes wherein the polysulfone-based separatory membranes manufactured according to the above-described processes are subjected to irradiation and/or heat treatment to make the hydrophilic polymer insoluble in water.

Further, Japanese Patent Application Laid-open No. 63-099,325 discloses polysulfone-based hollow fiber membranes having their inner surfaces smoothed by injecting an inside coagulating liquid containing at least 5% by weight of a water-solublepolymer when the foregoing dope system is spun from annular orifices.

Japanese Patent Applications Laid-open Nos. 61-238,834 and 63-099,325 disclose polysulfone-based porous membranes comprising 3–30% by weight of a hydrophilic polymer, having micropores of an average pore diameter of at least 500 angstroms and exhibiting a water-permeability of at least 1,000 ml/m$^2$·hr·mmHg, which are obtained according to the above-described manufacturing processes.

Japanese Patent Applications Laid-open Nos. 61-000,402 and 62-038,205 disclose separatory membranes predominantly comprising a hydrophobic polymer, asymmetrically structured to have a dense skin layer on one surface side comprising a mixture of the hydrophobic polymer and a hydrophilic polymer.

The above polysulfone-based separatory membranes comprising a hydrophilic polymer are provided with excellent properties, such as water-wettability, an improved water-permeability, capability of preventing the membranes from staining due to their adsorption of proteins, or the like. However, since their biocompatibility has not been studied thoroughly, these membranes are not always satisfactory in respect of an antithrombogenetic ability.

For example, Japanese Patent Application Laid-open No. 61-093,801 discloses polysulfone-based hollow fiber membranes suited for blood treatment. In this application, there is described that these hollow fiber membranes can restrain a complement activation on a low level. However, the capability of restraining a complement activation onto a low level is developable only in the case where the hollow fiber membranes are hydrophobic. Namely, it has been suggested that in the hollow fiber membranes disclosed in Japanese Patent Application Laid-open No. 61-093,801, their inner surfaces contacting with blood are not sufficiently made hydrophilic and still remain as hydrophobic. The hydrophobicity remaining on the surfaces contacting with blood causes platelets to readily deposit on the surfaces. If the platelets once deposit on inner surfaces of hollow fiber membranes, a substance to activate a blood coagulation system is released by aggregation and destruction of the platelets, whereby blood coagulation is brought about.

Alternatively, the polysulfone-based separatory membranes disclosed in Japanese Patent Application Publication No. 018,695/1990, since they have a water-absorbability of at least 11%, may absorb moisture in air during storing after fabrication. Therefore, a special equipment is required for preservation of these separatory membranes. Additionally, a high water-absorbability is attributed to a large content of a polyvinyl pyrrolidone in the membrane, so that it causes the mechanical properties and the water-permeability of the separatory membrane to deteriorate.

Further, as to the manufacturing processes of polysulfone-based separatory membranes disclosed in Japanese Patent Applications Laid-open Nos. 61-238,306 and 63-099,325 or the polysulfone-based separatory membranes disclosed in the Japanese Patent Application Laid-open No. 61-238,834, since the dope for forming membranes is incorporated with a hydrophilic polymer, the inner surfaces of the hollow fiber separatory membranes cannot be made sufficiently hydrophilic, similarly to the polysulfone-based hollow fiber membranes disclosed in Japanese Patent Application Laid-open No. 61-093,801. Additionally, those processes are suited for manufacturing separatory membranes having pores as large as at least 500 angstroms but not appropriate for manufacturing separatory membranes used for hemodialysis. In the manufacturing processes of polysulfone-based separatory membranes disclosed in Japanese Patent Application Laid-open No. 63-099,325, the inside coagulating liquid contains a water-soluble polymer which, however, only gives smoothness to inner surfaces of hollow fiber membranes and does not remain on the inner surfaces.

The polysulfone-based separatory membranes having an asymmetric structure disclosed in Japanese Patent Applications Laid-open Nos. 61-000,402 and 62-038,205 have only their dense skin layer made hydrophilic, so that the water-permeability of the separatory membranes in dry is extremely deteriorated. Besides, hydrophobic portions of the membranes adsorb proteins.

An object of the present invention, therefore, is to solve the above problems presented by the hitherto proposed polysulfone-based separatory membranes and to provide polysulfone-based hollow fiber membranes having an excellent biocompatibility with a water-permeability not deteriorated after drying, which are particularly suited for blood treatment.

Another object of the present invention is to provide processes for manufacturing the above polysulfone-based hollow fiber membranes.

SUMMARY OF THE INVENTION

The present inventors have made investigation into the hitherto proposed polysulfone-based hollow fiber membranes and manufacturing processes thereof with a view to achieve the above objects and have found unexpectedly that hollow fiber membranes having excellent physicochemical properties of polysulfone-based polymers together with an excellent hydrophilicity of pyrrolidone-based polymers, particularly being excellent in antithrombogenetic ability, can be provided when the hollow fiber membranes contain a polyglycol and a pyrrolidone-based polymer and further a large quantity of a vinylpyrrolidone-based polymer is present in the skin layer on the inner surface of the hollow fiber membranes. As a result of further investigation, the present invention has been achieved.

Namely, the polysulfone-based hollow fiber membrane according to the present invention has an asymmetric structure with a dense skin layer on its inner surface and a microporous, outer surface layer and is characterized by comprising at least 1% by weight of a polyglycol and 1–8% by weight of a vinylpyrrolidone-based polymer, the skin layer on the inner surface comprising a polysulfone-based polymer and a vinylpyrrolidone-based polymer in a content ratio by weight of the former to the latter being between 90/10 and 60/40, and a ratio of a weight percent of the vinylpyrrolidone-based polymer in said skin layer to a weight percent of the vinylpyrrolidone-based polymer in the outer surface layer being at least 1.1.

The process for manufacturing polysulfone-based hollow fiber membranes according to .the invention is characterized by the steps of:

extruding, from an annular orifice, a dope comprising a polysulfone-based polymer, a polyglycol having a weight-average molecular weight of 200–6000 and a vinylpyrrolidone-based polymer having a weight-average molecular weight of at least 10,000, mixed and dissolved in a solvent;

feeding a liquid containing 0.1–4% by weight of a vinylpyrrolidone-based polymer into a tubular flow of the dope being extruded from said annular orifice to form a polysulfone-based hollow fiber membrane; and treating the resulting polysulfone-based hollow fiber membrane with a solution acting as a poor solvent for said polysulfone-based polymer in such a manner that a ratio of a weight percent of the vinylpyrrolidone-based polymer in a skin layer on an inner surface to a weight percent of the vinylpyrrolidone-based polymer in an outer surface layer, of said hollow fiber membrane, is adjusted to at least 1.1.

BRIEF DESCRIPTION OF THE DRAWINGS

The above and other objects, features and advantages of the present invention will become more apparent from reading the following description of the preferred embodiments taken in connection with the accompanying drawings, wherein:

FIG. 1 is an SEM (scanning electron microscopic) photograph of 10,000× magnification showing a structural feature of the outer surface layer of the polysulfone-based hollow fiber membrane obtained in Example 2;

FIG. 2 is an SEM photograph of 10,000× magnification showing a structural feature of a skin layer on the inner surface of the above polysulfone-based hollow fiber membrane;

FIG. 3 is an SEM photograph of 1,500× magnification showing a sectional structural feature of the above polysulfone-based hollow fiber membrane;

FIG. 4 is an SEM photograph of 10,000× magnification showing a sectional structural feature of the outer surface side of the above polysulfone-based hollow fiber membrane;

FIG. 5 is an SEM photograph of 10,000× magnification showing a sectional structural feature of the central portion of the above polysulfone-based hollow fiber membrane; and FIG. 6 is an SEM photograph of 10,000× magnification showing a sectional structural feature of the inner surface side of the above polysulfone-based hollow fiber membrane.

DESCRIPTION OF THE PREFERRED EMBODIMENTS

The dope used for manufacturing the polysulfone-based hollow fiber membranes according to the present invention is basically of a four component system comprising a polysulfone-based polymer, a polyglycol having a weight-average molecular weight of 200–6,000, a vinylpyrrolidone-based polymer having a weight-average molecular weight of at least 10,000 and a solvent common thereto.

The polysulfone-based polymer generally has a recurring unit represented by the following formula (1) or (2):

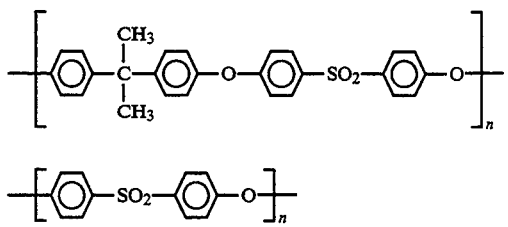

This polymer may comprise an additional functional group such as alkyl, sulfonic or the like group.

The concentration of the polysulfone-based polymer in the dope may be in such a range as to enable the manufacture of hollow fiber membranes having characteristics adapted to their practical purpose, that is, generally in the range between 10% and 25%, preferably between 15% and 20%, by weight. When it is less than 10% by weight, the strength of the obtained hollow fiber membranes will be so low that practically servable hollow fiber membranes cannot be obtained. Alternatively, when it exceeds 25% by weight, the resulting membranes will have decreased through-cavities to cause deterioration of permeability or dialyzability, which are not practical.

As a polyglycol, use may be made of polyethylene glycols, polypropylene glycols, copolymers thereof, and esters, amines, ethers and acetal derivatives thereof, having a weight-average molecular weight of 200–6,000. Since the dope is incorporated with a polyglycol, the present invention has advantages as follows:

Firstly, the polyglycol, since it acts as a poor solvent for polysulfones, is effective as a micropore-forming agent, so that its addition improves an effect of microphase separation to readily provide microporous membranes with a high porosity or a high open-void content on their surface layers, whereby separatory membranes having excellent permeability and dialyzability can be prepared.

Secondly, since polyglycols have a viscosity increasing effect on dopes as compared with usual micropore-forming agents, such as water, alcohols, glycerine, inorganic salts or the like, and yet the viscosities of the dopes do not change suddenly with changing load of the polyglycols, dopes having a viscosity suitable for manufacturing hollow fiber membranes can readily be prepared.

Thirdly, when a polyglycol is admixed with dopes containing a vinylpyrrolidone-based polymer as described hereinafter, it is recognized that the concentration of the vinylpyrrolidone-based polymer included in the resulting membranes tends to increase, so that even with dopes containing a low concentration of the vinylpyrrolidone-based polymer, hollow fiber membranes containing a higher concentration of the vinylpyrrolidone-based polymer can be obtained. Though the reason why the polyglycol admixed with a dope increases an efficiency of transfer of the vinylpyrrolidone-based polymer from the dope into the membranes is not clear., it is conjectured that the polyglycol is different in coagulating behavior from other micropore-forming agents or that the polyglycol plays a role as a dispersant. In either case, that a vinylpyrrolidone-based polymer loaded even in a small amount can be efficiently transferred into hollow fiber membranes is an advantageous feature in respect of the cost of production or adjustment of the concentration of the vinylpyrrolidone-based polymer in the membranes. Additionally, since loads of vinylpyrrolidone-based polymers can be decreased, it is easy to adjust viscosities of dopes to be within a range wherein a spinning operation can be stabilized.

Fourthly, the polyglycol admixed with dopes is not removed completely but some amount remains in the membranes. It has been recognized that the membranes containing the polyglycol together with a vinylpyrrolidone-based polymer tend to have an enhanced capability of preventing thrombogenesis.

Thus, the polyglycols are used with many advantages. In order to effectuate the above-described advantages in the present invention, the amount of the polyglycol to be added to a dope, though it depends on the weight-average molecular weight of the polyglycol, the concentration of the polysulfone-based polymer and the type of the solvent, is preferred to be 50–300%, more preferably 100–200%, by weight, based on the polysulfone-based polymer.

The vinylpyrrolidone-based polymer remains in the polysulfone-based hollow fiber membranes mainly to provide hydrophilicity thereto. As a vinylpyrrolidone-based polymer, use may be made of polymers having a weight-average molecular weight larger than that of the polyglycol employed, usually polymers having a weight-average molecular weight of at least 10,000. As such a vinylpyrrolidone-based polymer, mention may be made of polyvinylpyrrolidones, vinylpyrrolidone/vinylacetate copolymers, vinylpyrrolidone/vinylalcohol copolymers, vinylpyrrolidone/styrene copolymers, vinylpyrrolidone/dimethylaminoethyl methacrylate copolymers, modified polymers thereof, or the like.

The membranes are required to include the vinylpyrrolidone-based polymer in an amount enough to provide hydrophilicity. However, if the dope is admixed with the vinylpyrrolidone-based polymer in an excessive amount, its viscosity will increase so suddenly that hollow fiber membranes may become difficult to manufacture, or it takes a very long time to extract by washing a surplus vinylpyrrolidone-based polymer so that the extraction by washing is apt to become insufficient. Further, during drying of the hollow fiber membranes, the vinylpyrrolidone-based polymer appreciably migrates toward the outer surfaces of the membranes to cause sticking of the membranes to each others and impede handling or making modules of the hollow fiber membranes. If the amount of the vinylpyrrolidone-based polymer added is further increased, its content in the resulting hollow fiber membranes will increase so much as to impair their mechanical strengths and physical and chemical properties, such as resistance to heat, resistance to chemicals, or the like, which otherwise are exhibited on account of polysulfone-based polymers and, besides, to deteriorate water-permeability or dialysis performance accompanied with swelling of the vinylpyrrolidone-based polymer.

Therefore, an addition of a large amount of the vinylpyrrolidone-based polymer in dopes is not always preferred. The dopes are preferred to be admixed with the vinylpyrrolidone-based polymer in a minimal amount to provide hydrophilicity to the resulting polysulfone-based hollow fiber membranes. The amount of the added vinylpyrrolidone-based polymer is 2-30%, usually 5-15%, by weight based on the polysulfone-based polymer.

As a solvent, use may be made of various solvents, such as dimethyl formamide, dimethyl acetamide, N-methyl-2-pyrrolidone, dimethyl sulfoxide, sulfolane, dioxane or the like, or mixtures thereof, which can dissolve all the polysulfone-based polymers, polyglycols and vinylpyrrolidone-based polymers. Particularly, dimethyl formamide and dimethyl acetamide are preferred.

Various combinations of the above compounds may provide diversified dopes having different properties. For example, by using a solvent of a low dissolvability admixed with a relatively large amount of a polyglycol, dopes which are phase-separable at at least a certain specified temperature or even below can be obtained. If spinning is conducted with such dopes at around the phase-separating temperature, relatively porous hollow fiber membranes suited for microfiltration or the like can be manufactured. In contrast therewith, if a solvent of a high dissolvability admixed with a relatively small amount of a polyglycol is used, the resulting dopes will possess relatively stabilized properties that can provide dense membranes suited for ultrafiltration, dialysis or the like.

Using the dopes of the above system, polysulfone-based hollow fiber membranes are obtained. In membrane-forming operations are employable conventional dry-jet-wet spinning processes wherein a dope as the above and an inside coagulating liquid both kept at a constant temperature are simultaneously extruded from an annular orifice having a double structure of a spinneret into a gaseous atmosphere and then introduced into a coagulating bath. According to the dry-jet-wet spinning processes, extrudates pass through a gaseous atmosphere, generally air, during traveling from the outlet of the orifice to the coagulating bath. The distance of travel in air between the face of the spinneret and the surface of the coagulating bath (hereinafter referred to as "dry zone") is preferred to be generally 0.1-100 cm, particularly 1-50 cm. If it is less than 0.1 cm, even a small ripple of the surface of the coagulating bath will wet the spinneret, thereby rendering the dry-jet-wet spinning practical impossible to conduct. Alternatively, if it exceeds 100 cm, in the case of spinning using a multi-orifice spinneret, spun hollow fibers will stick to each others in the dry zone due to sway of the fibers. If the dry zone is humidified, the moisture in air may promote microphase separation or mild coagulation whereby hollow fiber membranes having many micropores of relatively large pore diameters in their outer surface layer can be readily obtained. This effect of the moisture has been recognized even when the dry zone is as short as 0.1 cm. Thus, hollow fiber membranes having a structural feature of the outer surface layer totally different from that of hollow fiber membranes produced by wet processes wherein spun fibers are directly steeped in a coagulating bath, can be obtained.

Further, the shape of the micropores in the outer surface layer of the membranes can be varied by changing a nozzle draft between the dope outlet and the first roller, that is, a ratio of the surface speed of the rotating first roller to the linear velocity of the dope at the outlet of the orifice. When the nozzle draft is increased, microslits tend to be formed. Contrarily, when the nozzle draft is decreased, relatively circular micropores tend to be formed. However, since an extreme increase or decrease of the nozzle draft will instabilize the spinning operation, the nozzle draft is usually set within the range between 2 and 5.

In the present invention, in order to increase the content of the vinylpyrrolidone-based polymer in the skin layer on the inner surface of the hollow fiber membranes, an inside coagulating liquid containing a vinylpyrrolidone-based polymer is used. The vinylpyrrolidone-based polymer used in the inside coagulating liquid is not necessarily the same as that admixed with dopes and may be different in type or molecular weight. However, if a vinylpyrrolidone-based polymer having a low weight-average molecular weight is used, it readily diffuses into inside the membranes, so that there may be a case where the content of the vinylpyrrolidone-based polymer in the skin layer on the inner surface is not so increased as expected. Though the vinylpyrrolidone-based polymer having a low weight-average molecular weight can be used in dense membranes, such as a dialysis membrane or the like, it is preferred in general to use high molecular polymers having a weight-average molecular weight of at least 1,000,000 which, even with a small amount, can increase efficiently the content of the polymer only in the skin layer on the inner surface.

As an inside coagulating liquid, use may be made of systems comprising a non-solvent or a poor solvent for polysulfone-based polymers, such as water, alcohols, glycols or the like, alone or in combination, and a vinylpyrrolidone-based polymer admixed therewith. Further, it is preferred to admix a solvent with the above systems to change coagulation rates, as the resulting inside coagulating liquid may serve to control pore diameters. The solvent is added at a concentration of preferably 10-90%, more preferably 30-80%, by weight. If the concentration is less than 10% by weight, the solvent substantially will not work effectively. Alternatively, if it is more than 90% by weight, the coagulation rate will be too low to stabilize spinning operations. Additionally, there may be preferable occasions such that an addition of an inorganic salt, such as lithium chloride, zinc chloride, sodium nitrate or the like, to the inside coagulation liquid is effective to increase the open-void content in the membranes. It is preferred to admix a vinylpyrrolidone-based polymer with the inside coagulating liquid generally in an amount of 0.1-4% by weight. If it is less than 0.1% by weight, the content of the vinylpyrrolidone-based polymer in the skin layer on the inner surface will not be increased effectively. If it exceeds 4% by weight, it will take uneconomically a long time to wash off surplus vinylpyrrolidone-based polymer and, moreover, there may be a fear of arising problems such that permeability and dialysis performances of the membranes are deteriorated due to an excessive content of the vinylpyrrolidone-based polymer in the skin layer on the inner surface. Accordingly, loads of vinylpyrrolidone-based polymer in inside coagulating liquids should be determined, taking account of the type and the weight-average molecular weight of the vinylpyrrolidone-based polymer, the content of the vinylpyrrolidone-based polymer in the dopes and the like. However, the vinylpyrrolidone-based polymer contained in the inside coagulating liquids are required to be completely dissolved therein before the liquids are used, so that the formulation of the liquids and the concentration of the polymer should be so determined as to meet the above requirements.

As a coagulating bath, use may be made of nonsolvents or poor solvents for polysulfone-based polymers, such as water, alcohols, glycols or the like, alone or in combination, and mixtures thereof with solvents. However, insofar as they are miscible with polar solvents, polyglycols and vinylpyrrolidone-based polymers, any solutions acting as poor solvents or nonsolvents for polysulfone-based polymers may be employed without specific limitations.

The hollow fiber membranes produced by coagulating in the coagulating bath are washed with water or hot water at 40°-70° C. or less to extract and remove solvents, polyglycol and vinylpyrrolidone-based polymers. In the course of washing, although most of the polyglycol and surplus vinylpyrrolidone-based polymer are extracted, they are both not completely extracted and remain in the membranes. The reason why the polyglycol and the vinylpyrrolidone-based polymer remain in the hollow fiber membranes after washing is conjectured that these polymers incorporated into the membranes are fixed thereon during coagulation of the membranes.

Next, a hot water treatment at at least 80° C. is conducted as the case may be. A preliminary hot water treatment effectively improves the efficiency of washing off solvents, polyglycols and vinylpyrrolidone-based polymers and enhances a heat stability of the membrane, whereby shrinking or the like of the hollow fiber membranes is prevented when the membranes are sterilized with autoclaving, for example, at at least 100° C.

In the present invention, after the above steps, the hollow fiber membranes are further treated with a liquid acting as a poor solvent for polysulfone-based polymers to extract and remove a surplus vinylpyrrolidone-based polymer existing over the whole membranes, particularly, in the outer surface layer of the membranes.

The liquid acting as a poor solvent is meant by a liquid which does not dissolve but swells or similarly acts on polysulfone-based polymers and dissolves vinylpyrrolidone-based polymers. Typical examples of such liquids include alcohols, ethylene glycol, propylene glycol, glycerine and polyethylene glycols having a weight-average molecular weight of at most 600, either alone or in combination, or at least 1 weight % aqueous solutions thereof. Alternatively, the above-described treating processes include a treating process wherein the hollow fiber membranes produced by coagulation and washing are subsequently subjected to the extracting treatment, and a treating process wherein the membranes are dried and modularized and then the membranes of each module are subjected to the extracting treatment. A treating process can be elected taking account of manufacturing conditions, processing feasibility, production efficiency, cost of production or the like, for example, in the case where the modularization could be impeded by sticking of hollow fiber membranes to each others occurring during drying, the former treating process may be advantageously employed, while in the case where the problem of sticking would not be posed and the extracting treatment could be conducted more efficiently after modularization, the latter may be favorably adopted. Further, a treatment by a combination of both the processes can be conducted. The above-described treating processes are aimed to improve production stabilities and further to control the content and the distribution of the vinylpyrrolidone-based polymers to adapt the membranes for blood treatment, so that formulations of the treating solution as well as treating time should be determined carefully taking the above into consideration.

The surplus polyglycols or vinylpyrrolidone-based polymers are extracted and removed through the treatment with water, hot water or a poor solvent, and only those incorporated into and fixed on the hollow fiber membranes remain, so that the remaining polymers substantially would not be eluted during using.

Upon an appraisal of eluates according to the method described in the test of eluate of dialysis membranes in "Quality and Test Methods of Dialyzer" shown in the Approval Standards for Dialysis-type of Artificial Kidney Apparatus (referred to as "approval standards for artificial kidney apparatus" hereinafter), the hollow fiber membranes of the present invention can clear the approval standards for artificial kidney apparatus as they show an absorbency of at most 0.1 with respect to an ultraviolet absorption spectrum in the wavelength range of 220-350 nm with a 10 mm layer length. Thus, the hollow fiber membranes according to the present invention can be employed in blood treatment apparatuses, specifically dialysis-type artificial kidney apparatus, even without subjecting to a special treatment for modifying the vinylpyrrolidone-based polymer into a water-insoluble crosslinked structure by means of a hitherto known process such as heat treatment, hot-alkali treatment, persulfate treatment, $\gamma$-rays irradiation or the like.

The hollow fiber membranes through the above treatment are wound up, for example, on a skein and dried. The dried hollow fiber membranes are then bundled and modularized by fixing the both ends of the bundle with a thermosetting resin such as polyurethane resins or the like onto a housing. After sterilizing by a conventional method, such as EOG sterilization, autoclave sterilization or the like, the modules are applied in hemodialysis, hemofiltration, hemoconcentration or the like, as a body fluid treating apparatus.

The above manufacturing processes can provide polysulfone-based hollow fiber membranes particularly suited for blood treatment, comprising at least 1% by weight of a polyglycol and 1-8% by weight of a vinylpyrrolidone-based polymer, a skin layer on the inner surface thereof comprising a polysulfone-based polymer and the vinylpyrrolidone-based polymer in a weight ratio of the former to the latter being between 90/10 and 60/40, and a ratio of a weight percent of the vinylpyrrolidone-based polymer in the skin layer on the inner surface to a weight percent of the vinylpyrrolidone-based polymer in the outer surface layer of the membrane being at least 1.1.

The above weight percents respectively of a polyglycol and a vinylpyrrolidone-based polymer in the hollow fiber membranes are determined according to the NMR analysis. The weight percents of the vinylpyrrolidone-based polymer in the skin layer on the inner surface and in the outer surface layer, respectively, of the hollow fiber membrane are determined according to the electron spectroscopy for chemical analysis (ESCA).

Alternatively, as a simple evaluation method to judge an antithrombogenetic ability of the hollow fiber membranes, there are two methods: one wherein modules after passing blood therethrough are dismounted and the number of hollow fiber membranes clogged by thrombi is counted; and another one wherein a concentration increase of either $\beta$-thromboglobulin, that is, a factor released by damaged platelet, or fibrino-peptide A released at the final stage of the production of fibrin from fibrinogen by virtue of an activity of a blood coagulation system, is determined.

The hollow fiber membranes according to the present invention comprise necessarily both a polyglycol and a vinylpyrrolidone-based polymer from the following reason.

Namely, using a polysulfone-based hollow fiber membrane (A) which was so spun as to comprise a vinylpyrrolidone-based polymer in the skin layer on the inner surface of the membrane in a content ratio by weight of vinylpyrrolidone-based polymer to polysulfone-based polymer of 15/85 and a polyglycol in an amount of 2% by weight and a hollow fiber membrane (B) comprising the vinylpyrrolidone-based polymer in the same content ratio in the skin layer on the inner surface as that of the membrane (A) but not comprising polyglycols, modules for artificial kidneys each having a membrane area of 1.7 m2 were fabricated and then applied in medical treatment of a patient of chronic renal failure. After the medical treatment, the modules were dismounted and the number of the hollow fibers clogged by blood coagulation was counted to compare clogging ratios. Then, the artificial kidney (A) using the hollow fiber membranes containing a polyglycol showed a clogging ratio of no more than 5%, while the artificial kidney (B) using the hollow fiber membranes not containing polyglycols showed a clogging ratio of 65%. Thus, it was demonstrated that the polysulfone-based hollow fiber membranes comprising both a vinylpyrrolidone-based polymer and a polyglycol are very effective in respect of the antithrombogenetic ability.

Further, a polyglycol is required to be present in an amount of at least 1% by weight in the hollow fiber membranes. If it is less than 1% by weight, there may be questions about an antithrombogenetic ability, so that the membranes can not be applied in blood treatment.

Next, according to the present invention, the content ratio by weight of the polysulfone-based polymer to the vinylpyrrolidone-based polymer, in a skin layer on the inner surface of the polysulfone-based hollow fiber membranes, should be between 90/10 and 60/40. With various polysulfone-based hollow fiber membranes manufactured by changing the above content, mini-modules having a membrane area of 500 cm2 were fabricated and fresh blood was then passed therethrough. Concentrations of $\beta$-thromboglobulin and fibrino-peptide A in the blood passing through the mini-modules were compared with concentrations in blood flowing only through a blood-circulating circuit (blank). With respect to hollow fiber membranes comprising at least 1% by weight of a polyglycol, when the content ratio of the vinylpyrrolidone-based polymer to the polysulfone-based polymer in the skin layer on the inner surface was at least 10/90, the concentrations of $\beta$-thromboglobulin and fibrino-peptide A as indexical substances were at most 110% and at most 120%, respectively, based on the concentrations of the blank, while when the above ratio was less than 10/90, the concentrations of these indexical substances were as high as 350% and 400%, respectively, based on the concentrations of the blank, which showed that the latter membranes are inferior in antithrombogenetic ability to the former. After passing blood, the mini-modules were dismounted and the number of hollow fiber membranes clogged with thrombi was counted. Then, it was found that when the content ratio by weight of the vinylpyrrolidone-based polymer to the polysulfone-based polymer was at least 10/90, only about several percent hollow fiber membranes were clogged, while when the above content ratio was less than 10/90, at least 50% hollow fiber membranes were clogged. On the other hand, when the content ratio of the vinylpyrrolidone-based polymer to the polysulfone-based polymer was more than 40/60, the concentrations of $\beta$-thromboglobulin and fibrino-peptide A were 105%–110% of the blank, which proved that the antithrombogenetic ability is maintained while the water-permeability is decreased. In view of these results, in order to provide an excellent antithrombogenetic ability, the hollow fiber membranes comprising at least 1% by weight of a polyglycol require that the skin layer on the inner surface thereof with which blood comes into contact, should comprise a vinylpyrrolidone-based polymer and a polysulfone-based polymer in a content ratio by weight of the vinylpyrrolidone-based polymer to the polysulfone-based polymer of at least 10/90, and in order to maintain good water-permeability and middle molecular weight substance permeability performances, the content ratio by weight of the vinylpyrrolidone-based polymer to the polysulfone-based polymer in the skin layer on the inner surface should be at most 40/60.

Alternatively, with respect to the vinylpyrrolidone-based polymer in the hollow fiber membranes according to the present invention, its weight percent in the skin layer on the inner surface should be at least 1.1 times its weight percent in the outer surface layer, of the membranes. Thus, the hollow fiber membranes containing the vinylpyrrolidone-based polymer in a more amount in the skin layer on the inner surface than that in the skin layer on the outer surface have remarkably improved permeability performances, as compared with conventional hollow fiber membranes containing the same amount of the vinylpyrrolidone-based polymer in the inner and the outer surface layers, that is, the membranes of the present invention have a water-permeability of at least 3 times and an inulin-permeation rate of at least 2 times the conventional membranes. Besides, the membranes of the invention have a sharp fractionating ability as well as high dialyzability performances for not only low molecular weight substances, such as urea or the like, but also low molecular weight proteins, such as $\beta_2$-microglobulin or the like. The reason why the permeability or dialyzability performances are improved is that when the skin layer on the inner surface contains a vinylpyrrolidone-based polymer in an amount more than the outer surface layer, the content of the vinylpyrrolidone-based polymer in the whole membrane can be far lessened than when the vinylpyrrolidone-based polymer is relatively uniformly distributed over the whole membrane, whereby resistance to permeation due to swelling of the vinylpyrrolidone-based polymer also can be decreased.

Further, in view of an effect upon antithrombogenetic ability of hollow fiber membranes, the ratio of the weight percent vinylpyrrolidone-based polymer in the skin layer on the inner surface to the weight percent vinylpyrrolidone-based polymer in the outer surface layer is preferred to be at least 1.5, more preferably at least 2.0.

Alternatively, in order to have hydrophilicity, excellent water-permeability or other-substance-permeability, the whole hollow fiber membrane is preferred to contain the vinylpyrrolidone-based polymer in an amount of 1–8% by weight, usually 2–5% by weight. If the above content is less than 1% by weight, the membranes will have an insufficient hydrophilicity, while if it exceeds 8% by weight, deteriorations of permeability and dializability performances accompanied with swelling of the vinylpyrrolidone-based polymer will be brought about and, moreover, physical or chemical characteristics, such as mechanical strength, resistance to heat, resistance to chemicals or the like, will be lost, otherwise provided by polysulfone-based polymers.

The hollow fiber membranes of the present invention have an inside diameter of 50–500 $\mu$m and a membrane thickness of 5–250 $\mu$m. If the inside diameter is less than 50 $\mu$m, the hollow fiber membranes will undergo a great pressure loss, while if it exceeds 500 $\mu$m, the modules naturally will have to be fabricated large in size so that their handling may become inconvenient. Alternatively, if the membrane is less than 5 $\mu$m thick, spinning operation will be difficult to conduct and leaks of the membranes tend to occur, while if the thickness exceeds 250 $\mu$m, water-permeability and dialyzability will be remarkably decreased and, in addition, the modules will have to be uneconomically enlarged in size.

The hollow fiber membranes of the present invention have many micropores of a 0.05–1 $\mu$m pore diameter in the outer surface layer and many microslits of a 0.001–0.05 $\mu$m slit-width in the skin layer on the inner surface. Besides, the membranes have an asymmetrical cross-sectional structure consisting of: a dense skin layer 0.1–3 $\mu$m thick on the inner surface for separating substantially substances from filtrates, which contains micropores having a pore diameter gradually increasing toward a core layer supporting the skin layer; a supporting core layer of a reticular texture having micropores of a 1–5 $\mu$m average pore diameter; and a layer of a reticular texture having micropores of a 0.1–0.5 $\mu$m average pore diameter on the outer surface.

Hollow fiber membranes having a dense skin layer with hardly visible micropores on the outer surface have a low filtering rate and particularly when applied in blood treatment, such membranes have an extremely low filtering rate and, moreover, are deteriorated in the permeability performance for filtering-off substances, such as low molecular weight proteins or middle molecular weight substances having a molecular weight of several thousands to ten thousands or thereabouts, as well as the dialyzability performance for low molecular substances, such as urea or the like. In contrast, the polysulfone-based hollow fiber membranes according to the present invention, since they have a dense skin layer on the inner surface and a reticular or microporous layer on the outer surface which is denser than the supporting core layer, are so excellent in mechanical strength that they may hardly leak, maintaining an excellent solute-permeability.

Hereinbelow the present invention will be explained referring to examples, but they are by no means limitations of the invention.

The water-permeability in the present invention was determined according to the following method: a labomodule of an inside pressurizing type having an effective length of 15 cm was fabricated and the quantity of the water permeating the hollow fiber membranes per a constant time under conditions of a water flow pressure of 0.5 kg/cm$^2$ at 25° C. was measured.

Alternatively, the weight percents respectively of the polyglycol and the vinylpyrrolidone-based polymer in the hollow fiber membranes were measured according to the nuclear magnetic resonance (NMR) analysis. The weight percent vinylpyrrolidone-based polymer in the skin layer on the inner surface or in the outer surface layer was determined according to the electron spectroscopy for chemical analysis (ESCA) as follows: namely, the weight percents of sulfur (S) in the polysulfone-based polymer and nitrogen (N) in the vinylpyrrolidone-based polymer were found and these weight percents of S and N were converted to the weights ($W_{ps}$ and $W_{vp}$) of the polysulfone-based polymer and the vinylpyrrolidone-based polymer, respectively. The weight percent (R%) of the vinylpyrrolidone-based polymer in the skin layer on the inner surface or in the outer surface layer of the hollow fiber membrane was found by the following equation:

$$R(\%) = W_{vp}/(W_{ps} + W_{vp}) \times 100$$

Further, the ratio (P) of the weight percent vinylpyrrolidone-based polymer in the skin layer on the inner surface ($R_{in}$) to that in the outer surface layer ($R_{out}$) was found by the following equation:

$$P = R_{in}/R_{out}$$

EXAMPLE 1

A homogeneous transparent dope was prepared by mixing 17% by weight of a polysulfone (UDEL P1700, manufactured by Amoco, hereinafter referred to as "PS"), 12.75% by weight of a polyethylene glycol (PEG 600, weight-average molecular weight: 600, manufactured by Sanyo Chemical Industries, hereinafter referred to as "PEG"), 2.55% by weight of a polyvinylpyrrolidone (K-90, weight-average molecular weight: 1,200,000, manufactured by GAF, hereinafter referred to as "PVP") and 67.7% by weight of dimethylacetamide (hereinafter referred to as "DMA"), and thereafter stirring the mixture while heating.

After being left to stand still at 45° C. for 16 hours to effect deaeration, the dope was extruded at 50° C. from annular orifices having outside and inside diameters of 0.5 mm and 0.25 mm, respectively, together with an inside coagulating liquid consisting of 40% by weight of DMA, 0.5% by weight of PVP and 59.5% by weight of water, into the atmosphere conditioned to a relative humidity of 80% and a temperature of 50° C. After running through an air dry zone 10 cm long, the extrudate was introduced at a rate of 12 m/min. into water at 50° C. and coagulated into hollow fibers. The then nozzle draft was 3.2.

Then, after washing with hot water at 60° C., treating with hot water at 90° C. and then soaking in a 6 weight % glycerin aqueous solution at 90° C. for 5 minutes, the resulting fibers were wound on a frame and dried to provide hollow fiber membranes having outside and inside diameters of 280 $\mu$m and 200 $\mu$m, respectively.

The obtained hollow fiber membranes exhibited a water-permeability of 200 1/m$^2$·hr·(kg/cm$^2$), contained 5.5% by weight of PVP and 2.0% by weight of PEG in the membranes and had a content ratio by weight of PVP to PS of 23/77 in the skin layer on the inner surface and a ratio of the weight percent PVP in the skin layer on the inner surface to the weight percent PVP in the outer surface layer of 2.0. Further, upon an appraisal of eluates according to the approval standards for artificial kidney apparatus, the obtained hollow fiber membranes cleared these standards as they showed an absorbency of 0.051 with respect to an ultraviolet absorption spectrum at a wavelength of 220 nm with a 10 mm layer length.

With a bundle of 9,700 ends of this hollow fiber membrane, modules for artificial kidneys having an effective membrane area of 1.7 m² were fabricated. These modules were sterilized by means of ethylene oxide gas, autoclave and γ-rays, respectively. Each of these sterilized modules was applied in medical treatment of a same patient of chronic renal failure and conditions of remaining blood (by clogging in the hollow fiber) was compared. With respect to the modules sterilized with ethylene oxide gas and autoclave, respectively, substantially no remaining blood was observed, while in the module sterilized with γ-rays, appreciable remaining blood (by clogging in the hollow fiber) was recognized.

Additionally, when the above resulting hollow fiber membranes were dissolved in chloroform, insoluble matter was observed for only the membranes subjected to the γ-rays sterilization. It is assumed that the insoluble matter is a crosslinked PVP, which serves to increase the remaining blood and decrease the antithrombogenetic ability.

EXAMPLE 2

A homogeneous transparent dope was prepared by mixing 17% by weight of PS, 20.4% by weight of PEG, 1.7% by weight of PVP and 60.9% by weight of DMA, and thereafter stirring the mixture while heating.

After being left to stand still at 45° C. for 16 hours to effect deaeration, the dope was extruded at 50° C. from annular orifices having outside and inside diameters of 0.5 mm and 0.25 mm, respectively, together with an inside coagulating liquid consisting of 40% by weight of DMA, 0.3% by weight of PVP and 59.7% by weight of water, into the atmosphere conditioned to a relative humidity of 80% and a temperature of 50° C. After running through an air dry zone 10 cm long, the extrudate was introduced at a rate of 12 m/min. into water at 50° C. and coagulated into hollow fibers. The then nozzle draft was 3.2. Then, after washing with hot water at 60° C., treating with hot water at 90° C. and then soaking in a 6 weight % glycerin aqueous solution at 90° C. for 5 minutes, the resulting fibers were wound on a frame and dried to provide hollow fiber membranes having outside and inside diameters of 280 μm and 200 μm, respectively. Additionally, the hollow fiber membranes exhibited no tackiness after drying and were able to manufacture with stability.

In the SEM photograph of 10,000× magnification shown in FIG. 1, it is observed that the hollow fiber membranes have many micropores of a 0.05-1 μm diameter in the outer surface layer. Alternatively, in the SEM photograph of 10,000× magnification shown in FIG. 2, it is observed that many slit-like microvoids 0.001-0.03 μm wide are present in the skin layer on the inner surface. The SEM photograph of 1,500× magnification shown in FIG. 3 illustrates a cross-sectional structural feature of the hollow fiber membranes, and the SEM photographs of 10,000× magnification shown in FIGS. 4, 5 and 6, respectively, illustrate cross-sectional structural features of the outer surface layer, the core layer and the skin layer on the inner surface. From FIGS. 3-6, it is seen that these membranes have an asymmetrical cross-sectional structure which is composed of: a dense skin layer 0.2-1 μm thick formed on the inner surface, having micropores with a pore diameter gradually increasing toward the core layer inside the membrane; a core layer of a network structure having micropores of a 1-3 μm average pore diameter; and a layer of a reticular texture having micropores of a 0.1-0.3 μm pore diameter formed on the outer surface.

The obtained hollow fiber membranes exhibited a water-permeability of 300l/m²·hr·(Kg/cm²), contained 3.5% by weight of PVP and 2.2% by weight of PEG in the membranes and had a content ratio by weight of PVP to PS of 23/77 in the skin layer on the inner surface and a ratio of the weight percent PVP in the skin layer on the inner surface to the weight percent PVP in the outer surface layer of 2.1.

EXAMPLE 3

A homogeneous transparent dope was prepared by mixing 17% by weight of PS, 34.0% by weight of PEG, 0.4% by weight of PVP and 48.6% by weight of DMA, and thereafter stirring the mixture while heating.

After being left to stand still at 45° C. for 16 hours to effect deaeration, the dope was extruded at 50° C. from annular orifices having outside and inside diameters of 0.5 mm and 0.25 mm, respectively, together with an inside coagulating liquid consisting of 40% by weight of DMA, 1.5% by weight of a polyvinylpyrrolidone (K-120, weight-average molecular weight: 2,500,000, manufactured by GAF) and 58.5% by weight of water, into the atmosphere conditioned to a relative humidity of 80% and a temperature of 50° C. After running through an air dry zone 10 cm long, the extrudate was introduced at a rate of 12 m/min. into water at 50° C. and coagulated into hollow fibers. The then nozzle draft was 3.2.

Then, after washing with hot water at 60° C., treating with hot water at 90° C. and then soaking in a 5 weight % glycerin aqueous solution at 90° C. for 5 minutes, the resulting fibers were wound on a frame and dried to provide hollow fiber membranes having outside and inside diameters of 280 μm and 200 μm, respectively.

The obtained hollow fiber membranes exhibited a water-permeability of 400l/ m²·hr·(Kg/cm²), contained 2.8% by weight of PVP and 2.2% by weight of PEG in the membranes and had a content ratio by weight of PVP to PS of 32/68 in the skin layer on the inner surface and a ratio of the weight percent PVP in the skin layer on the inner surface to the weight percent PVP in the outer surface layer of 16.5.

Additionally, the hollow fiber membranes exhibited no tackiness after drying and were able to manufacture with stability.

EXAMPLE 4

A homogeneous transparent dope was prepared by mixing 17% by weight of PS, 20.4% by weight of PEG, 1.7% by weight of a vinylpyrrolidone/vinylacetate copolymer (S630, manufactured by GAF, hereinafter referred to as "PVP/VA") and 60.9% by weight of DMA, and thereafter stirring the mixture while heating. After being left to stand still at 45° C. for 16 hours to effect deaeration, the dope was extruded at 50° C. from annular orifices having outside and inside diameters of 0.5 mm and 0.25 mm, respectively, together with an inside coagulating liquid consisting of 40% by weight of DMA, 0.5% by weight of PVP/VA, and 59.5% by weight of water, into the atmosphere conditioned to a relative humidity of 80% and a temperature of 50° C. After running through an air dry zone 10 cm long, the extrudate was introduced at a rate of 12 m/min. into water at 50° C. and coagulated into hollow fibers. The then nozzle draft was 3.2. Then, after washing with hot water at 60° C., treating with hot water at 90° C. and then soaking in a 10 weight % ethanol aqueous solution at 30° C. for 5 minutes, the resulting fibers were wound on a frame and dried to provide hollow fiber membranes having outside and inside diameters of 280 μm and 200 μm, respectively.

The obtained hollow fiber membranes exhibited a water-permeability of 480l/m$^2$·hr·(Kg/cm$^2$), contained 3.2% by weight of PVP/VA and 2.1% by weight of PEG in the membranes and had a content ratio by weight of PVP/VA to PS of 21/79 in the skin layer on the inner surface and a ratio of the weight percent PVP/VA in the skin layer on the inner surface to the weight percent PVP/VA in the outer surface layer of 1.7.

Additionally, the hollow fiber membranes exhibited no tackiness after drying and were able to manufacture with stability.

EXAMPLE 5

A homogeneous transparent dope was prepared by mixing 17% by weight of PS, 10.2% by weight of PEG, 1.7% by weight of PVP and 71.1% by weight of DMA, and thereafter stirring the mixture while heating. After being left to stand still at 45° C. for 16 hours to effect deaeration, the dope was extruded at 50° C. from annular orifices having outside and inside diameters of 0.5 mm and 0.25 mm, respectively, together with an inside coagulating liquid consisting of 40% by weight of DMA, 0.5% by weight of PVP and 59.5% by weight of water, into the atmosphere conditioned to a relative humidity of 80% and a temperature of 50° C. After running through an air dry zone 10 cm long, the extrudate was introduced at a rate of 12 m/min. into water at 50° C. and coagulated into hollow fibers. The then nozzle draft was 3.2. Then, after washing with hot water at 60° C., treating with hot water at 90° C. and then soaking in an 8 weight % glycerin aqueous solution at 80° C. for 10 minutes, the resulting fibers were wound on a frame and dried to provide hollow fiber membranes having outside and inside diameters of 280 μm and 200 μm, respectively.

The obtained hollow fiber membranes exhibited a water-permeability of 260 l/m$^2$·hr·(Kg/cm$^2$), contained 2.8% by weight of PVP and 1.9% by weight of PEG in the membranes and had a content ratio by weight of PVP to PS of 15/85 in the skin layer on the inner surface and a ratio of the weight percent PVP in the skin layer on the inner surface to the weight percent PVP in the outer surface layer of 1.9.

Additionally, these hollow fiber membranes exhibited no tackiness after drying and were able to manufacture with stability.

COMPARATIVE EXAMPLE 1

A homogeneous transparent dope was prepared by mixing 17% by weight of PS, 34.0% by weight of PEG and 49.0% by weight of DMA, and thereafter stirring the mixture while heating. After being left to stand still at 45° C. for 16 hours to effect deaeration, the dope was extruded at 50° C. from annular orifices having outside and inside diameters of 0.5 mm and 0.25 mm, respectively, together with an inside coagulating liquid consisting of 40% by weight of DMA and 60% by weight of water, into the atmosphere conditioned to a relative humidity of 80% and a temperature of 50° C. After running through an air dry zone 10 cm long, the extrudate was introduced at a rate of 12 m/min. into water at 50° C. and coagulated into hollow fibers. The then nozzle draft was 3.2. Then, after washing with hot water at 60° C., treating with hot water at 90° C. and then soaking in a 10 weight % glycerin aqueous solution at 90° C. for 15 minutes, the resulting fibers were wound on a frame and dried to provide hollow fiber membranes having outside and inside diameters of 280 μm and 200 μm, respectively.

The obtained hollow fiber membranes exhibited a water-permeability of 800l/m$^2$·hr·(kg/cm$^2$).

COMPARATIVE EXAMPLE 2

A homogeneous transparent dope was prepared by mixing 17% by weight of PS, 1.0% by weight of water, 6.0% by weight of PVP and 76.0% by weight of DMA, and thereafter stirring the mixture while heating. After being left to stand still at 45° C. for 16 hours to effect deaeration, the dope was extruded at 50° C. from annular orifices having outside and inside diameters of 0.5 mm and 0.25 mm, respectively, together with an inside coagulating liquid consisting of 40% by weight of DMA and 60% by weight of water, into the atmosphere conditioned to a relative humidity of 80% and a temperature of 50° C. After running through an air dry zone 10 cm long, the extrudate was introduced at a rate of 12 m/min. into water at 50° C. and coagulated into hollow fibers. The then nozzle draft was 3.2. Then, after washing with hot water at 60° C. treating with hot water at 90° C. and then soaking in an 8 weight % glycerin aqueous solution at 90° C. for 10 minutes, the resulting fibers were wound on a frame and dried to provide hollow fiber membranes having outside and inside diameters of 280 μm and 200 μm, respectively.

The obtained hollow fiber membranes exhibited a water-permeability of 80l/m$^2$·hr·(kg/cm$^2$), contained 5% by weight of PVP therein and had a content ratio by weight of PVP to PS of 16/84 in the skin layer on the inner surface and a ratio of weight percent PVP in the skin layer on the inner surface to the weight percent PVP in the outer surface layer of 0.7.

Additionally, this hollow fiber membranes exhibited a great deal of tackiness after drying and was unable to manufacture with stability.

COMPARATIVE EXAMPLE 3

The same dope as that of Example 2 was extruded at 50° C., together with an inside coagulating medium consisting of 40% by weight of DMA and 60% by weight of water, into the atmosphere conditioned to a relative humidity of 80% and a temperature of 50° C. After running through an air dry zone 10 cm long, the extrudate was introduced at a rate of 12 m/min. into water at 50° C. and coagulated into hollow fibers. The then nozzle draft was 3.2. Then, after washing with hot water at 60° C., treating with hot water at 90° C. and then soaking in a 6 weight % glycerin aqueous solution at 90° C. for 5 minutes, the resulting fibers were wound on a frame and dried to provide hollow fiber membranes having outside and inside diameters of 280 μm and 200 μm, respectively.

The obtained hollow fiber membranes exhibited a water-permeability of 600l/m$^2$·hr·(kg/cm$^2$), contained 3.0% by weight of PVP and 2.1% by weight of PEG in the membranes and had a content ratio by weight of PVP to PS of 8/92 in the skin layer on the inner surface and a ratio of the weight percent PVP in the skin layer on the inner surface to the weight percent PVP in the outer surface layer of 0.8.

COMPARATIVE EXAMPLE 4

The hollow fiber membranes spun in the same manner as Example 2 were washed with hot water at 60° C., treated with hot water at 90° C. and then without soaking in the glycerin aqueous solution, wound on a frame and dried to provide hollow fiber membranes, each having outside and inside diameters of 280 μm and 200 μm, respectively. The obtained hollow fiber membranes stuck a great deal with each others after drying, so that they were unable to manufacture with stability. Additionally, the hollow fiber membranes exhibited a water-permeability so extremely low as 125l/m²·hr·(kg/cm²) that their practical use was questioned.

EXAMPLE 6

A homogeneous transparent dope was prepared by mixing 17% by weight of PS, 22.0% by weight of PEG, 1.7% by weight of PVP and 59.3% by weight of dimethylformamide, and thereafter stirring the mixture while heating.

After being left to stand still at 45° C. for 16 hours to effect deaeration, the dope was extruded at 30° C. from annular orifices having outside and inside diameters of 0.7 mm and 0.3 mm, respectively, together with an inside coagulating medium consisting of 59.5% by weight of dimethylformamide, 0.5% by weight of PVP and 39.5% by weight of water, into the atmosphere conditioned to a relative humidity of 80% and a temperature of 50° C. After running through an air dry zone 10 cm long, the extrudate was introduced at a rate of 10.5 m/min. into water at 50° C. and coagulated into hollow fibers. The then nozzle draft was 3.8. Then, after washing with hot water at 60° C. treating with hot water at 90° C. and then soaking in a 7.5 weight % glycerin aqueous solution at 75° C. for 10 minutes, the resulting fibers were wound on a frame and dried to provide hollow fiber membranes having outside and inside diameters of 360 μm and 230 μm, respectively.

The obtained hollow fiber membranes exhibited a water-permeability of 850l/m²·hr·(kg/cm²), contained 2.7% by weight of PVP and 1.8% by weight of PEG in the membranes and had a content ratio by weight of PVP to PS of 20/80 in the skin layer on the inner surface and a ratio of the weight percent PVP in the skin layer on the inner surface to the weight percent PVP in the outer surface layer of 3.0.

Additionally, these hollow fiber membranes exhibited no tackiness after drying and were able to manufacture with stability.

EXAMPLE 7

Modules for artificial kidneys having an effective membrane area of 1.7 m² were fabricated with bundles of 9,700 ends of the hollow fiber membranes obtained in Examples 2, 3 and 5 and Comparative Examples 1–3, respectively. These modules were sterilized by means of autoclave sterilization in wet. Using these modules, UFR (ultrafiltration rate) and dialysis performances were determined in accordance with the performance assessment standard of the Japanese Society for Artificial Organs. Alternatively, the determination of sieving coefficients of albumin and inulin was conducted according to the method shown in "JIN TO TOHSEKI (Kidney and Dialysis)", Separate Vol. 27, No. 167 (1989) published by the Japanese Society for Medical Treatment with High-Performance Membrane. The results of the determinations are shown in Table 1.

TABLE 1

| | C urea. (ml/min) | C inu. (ml/min) | Sc alb. | Sc inu. | UFR | Blood remaining condition |
|---|---|---|---|---|---|---|
| Example 2 | 190 | 103 | 0.001 | 0.99 | 6.4 | ◎ |
| Example 3 | 191 | 110 | 0.001 | 0.99 | 9.1 | ◎ |
| Example 5 | 185 | 98 | 0.001 | 0.97 | 5.1 | ○ |
| Comparative Example 1 | 195 | 128 | 0.002 | 0.99 | 17.5 | x |
| Comparative Example 2 | 158 | 57 | 0.000 | 0.48 | 2.3 | Δ |
| Comparative Example 3 | 192 | 89 | 0.000 | 0.95 | 12.1 | x |

[Footnotes]
C urea: clearance of urea,
C inu: clearance of inulin,
Sc alb: sieving coefficient of albumin,
Sc inu: sieving coefficient of inulin,
UFR: ultrafiltration rate, ml/(min · m² · mmHg)
Blood remaining condition:
◎: trace,
○: some,
Δ: fairly much,
x: much From Table 1, it is understood that the modules of Examples 2, 3 and 5 are excellent in all the dialysis performances, etc., show little remaining blood (by clogging in the hollow fiber) and have an excellent antithrombogenetic ability. On the other hand, the module of Comparative Example 1 is also excellent in the dialysis performance but there is a question of antithrombogenetic ability. Further, the modules of Comparative Examples 2 and 3 have a poor dialysis performance and there is also a problem in antithrombogenetic ability.

As demonstrated in the examples and the comparative examples, the polysulfone-based hollow fiber membranes of the present invention comprise such hydrophilic polymers of which types, contents and configurations can provide membranes with excellent biocompatibility, particularly antithrombogenetic ability, and besides have a sharp fractionating ability. Therefore, in the body fluid treatment, for example, hemodialysis, with the hollow fiber membranes of the present invention, no or substantially no remaining blood (by clogging in the hollow fiber) is observed by virtue of an excellent antithrombogenetic ability, so that hemodialysis therapy can be conducted with safety. Alternatively, in medical treatment such as continuous hemofiltration (CAVH) wherein filtration is continuously conducted for a long time, the hollow fiber membranes of the invention can be used without clogging by thrombi even with a small dose of heparin. Further, since middle molecular weight substances can permeate but useful proteins such as albumin are not removed, the membranes of the present invention can maintain a colloid osmotic pressure.

Additionally, the manufacturing processes of the polysulfone-based hollow fiber membranes according to the present invention, since the viscosity of the dopes can be easily controlled and, in addition, the content of the vinylpyrrolidone-based polymers in the skin layer on the inner surface of the hollow fiber membranes is low, the hollow fiber membranes do not stick to each others during manufacturing so that they can be produced with stability.

What is claimed is:

1. A polysulfone-based hollow fiber membrane having an asymmetric structure comprising a skin layer on its inner surface and an outer surface layer, said membrane comprising predominantly a polysulfone-based polymer, at least 1% by weight of polyglycol, and 1-8% by weight of a vinylpyrrolidone-based polymer, said skin layer comprising a polysulfone-based polymer and a vinylpyrrolidone-based polymer in a weight ratio of the former to the latter of between 90/10 and 60/40, and a ratio of the weight percent vinylpyrrolidone-based polymer in said skin layer to the weight percent vinylpyrrolidone-based polymer in an outer surface layer of the membrane of at least 1.1.

2. The hollow fiber membrane according to claim 1, wherein said polyglycol is a polyethylene glycol.

3. The hollow fiber membrane according to claim 1, wherein said vinylpyrrolidone-based polymer is selected from the group consisting of polyvinylpyrrolidones, vinylpyrrolidone/vinylacetate copolymers, vinylpyrrolidone/vinylalcohol copolymers, vinylpyrrolidone/styrene copolymers, vinylpyrrolidone/dimethylaminoethyl methacrylate copolymers, and modified polymers thereof.

4. The hollow fiber membrane according to claim 1, wherein said ratio of the weight percent vinylpyrrolidone-based polymer in the skin layer to the weight percent vinylpyrrolidone-based polymer in an outer surface layer of the membrane is at least 1.5.

5. The hollow fiber membrane according to claim 1, wherein said ratio of the weight percent vinylpyrrolidone-based polymer in the skin layer to the weight percent vinylpyrrolidone-based polymer in an outer surface layer of the membrane is at least 2.0.

6. A process for manufacturing polysulfone-based hollow fiber membranes, which comprises the steps of:
extruding, from an annular orifice, a dope comprising a polysulfone-based polymer, a polyglycol having an average molecular weight of 200–6000 and a vinylpyrrolidone-based polymer having an average molecular weight of at least 10,000, mixed and dissolved in a solvent;
feeding a liquid containing 0.1–4% by weight of a vinylpyrrolidone-based polymer into a tubular flow of said dope being extruded from said annular orifice to form a polysulfone-based hollow fiber membrane; and
treating the resulting polysulfone-based hollow fiber membrane with a solution acting as a poor solvent for said polysulfone-based polymer in such a manner that a ratio of the weight percent vinylpyrrolidone-based polymer in a skin layer on an inner surface to the weight percent vinylpyrrolidone-based polymer in an outer surface layer, of said hollow fiber membrane, is adjusted to at least 1.1.

7. The process according to claim 6, wherein said polyglycol is a polyethylene glycol.

8. The process according to claim 6, wherein said vinylpyrrolidone-based polymer is selected from the group consisting of polyvinylpyrrolidones, vinylpyrrolidone/vinylacetate copolymers, vinylpyrrolidone/vinylalcohol copolymers, vinylpyrrolidone/styrene copolymers, vinylpyrrolidone/dimethylaminoethyl methacrylate copolymers, and modified polymers thereof.

9. The process according to claim 6, wherein said solution acting as a poor solvent for the polysulfone-based polymer is at least one liquid selected from the group consisting of water, alcohols, ethylene glycol, propylene glycol, glycerine and polyethylene glycols having a weight-average molecular weight of at most 600.

10. The process according to claim 6, wherein the step of treating the polysulfone-based hollow fiber membrane with said solution acting as a poor solvent is conducted in such a manner that a ratio of the weight percent vinylpyrrolidone-based polymer in a skin layer on an inner surface to the weight percent vinylpyrrolidone-based polymer in an outer surface layer, of said hollow fiber membrane, is adjusted to at least 1.5.

11. The process according to claim 6, wherein the step of treating the polysulfone-based hollow fiber membrane with said solution acting as a poor solvent is conducted in such a manner that a ratio of the weight percent vinylpyrrolidone-based polymer in a skin layer on an inner surface to the weight percent vinylpyrrolidone-based polymer in an outer surface layer, of said hollow fiber membrane, is adjusted to at least 2.0.

* * * * *